(No Model.)
T. H. PAESSLER.
VEHICLE.
No. 328,709. Patented Oct. 20, 1885.
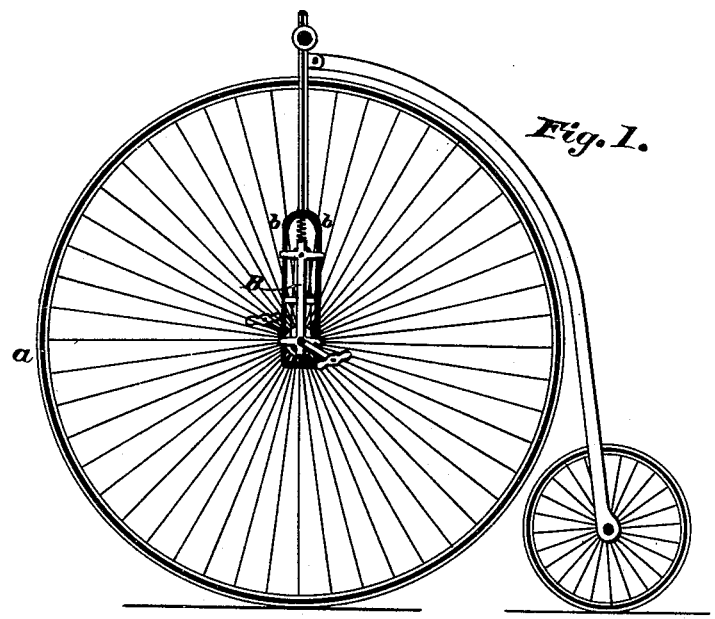
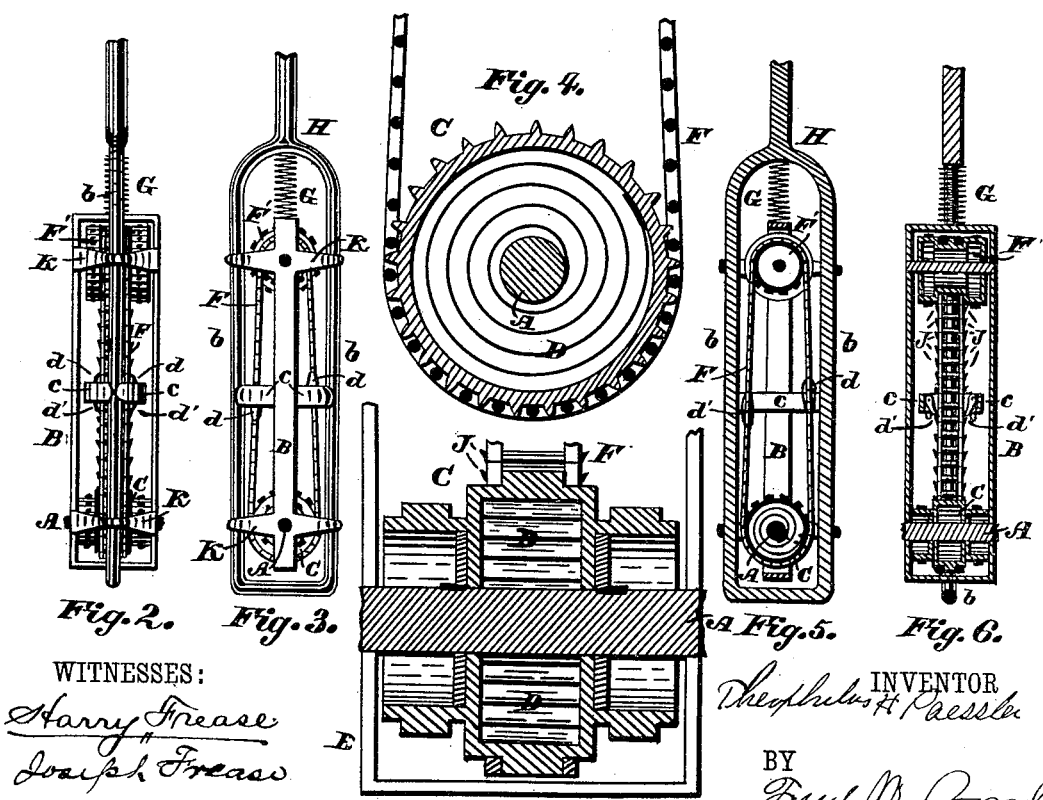
WITNESSES:
Harry Frease
Joseph Frease
INVENTOR
Theophilus H. Paessler
BY
Fred M. Bond
ATTORNEY

UNITED STATES PATENT OFFICE.

THEOPHILUS H. PAESSLER, OF MALVERN, OHIO.

VEHICLE.

SPECIFICATION forming part of Letters Patent No. 328,709, dated October 20, 1885.

Application filed July 17, 1885. Serial No. 171,845. (No model.)

*To all whom it may concern:*

Be it known that I, THEOPHILUS H. PAESSLER, a citizen of the United States, residing at Malvern, in the county of Carroll and State of Ohio, have invented certain new and useful Improvements in Devices for Utilizing the Jar of Vehicles; and I do hereby declare that the following is a full, clear, and exact description of the same, reference being had to the annexed drawings, making a part of this specification, and to the letters and figures of reference marked thereon, in which—

Figure 1 is a side elevation. Fig. 2 is a side view of frame and its attachments, looking from the front or rear end of the bicycle. Fig. 3 is a side view of frame, looking from either side of the bicycle. Fig. 4 is a cross-section of barrel or drum, showing spring located therein. Fig. 5 is a longitudinal section of Fig. 3. Fig. 6 is a longitudinal section of Fig. 2. Fig. 7 is a longitudinal section of the barrel or drum, showing all of the different parts belonging to said barrel or drum.

The present invention has relation to the utilization of the jar of vehicles while in motion, and may be applied to bicycles, tricycles, velocipedes, wagons, and cars; and its nature consists in the different parts and combination of parts hereinafter described, and particularly pointed out in the claims.

Similar letters of reference indicate corresponding parts in all the figures of the drawings.

In the accompaying drawings, A represents the axle, to which the wheel $a$ is rigidly attached; but in applying my invention to different kinds of vehicles in some instances it may be necessary to have the traveling wheel or wheels loosely attached to the axle. The ends of the axle A are located in the frames B, suitable bearings being provided for said axle. It will be understood that when but one wheel is used, as in the bicycle shown, two frames, B, are used, one on each side of the wheel, and when two wheels are placed on one axle one frame is used for each wheel. The frame B is located as shown in the drawings, and is so arranged that said frame B will move up and down on the arms $b\ b$, together with the axle A and its attachments, as the vehicle is jarred, the movement of the frame B being for the purpose hereinafter described. On each side of the wheel $a$ are located the spring barrels or drums C, which are loosely attached to the axle A, so as to revolve independent of the axle A so far as the tension of the spring D will admit. The spring D is a coiled spring, and is located in the barrel or drum C, as shown in Fig. 4, one end of said spring D being securely attached to the axle A, the opposite end being securely attached to the inside periphery of the barrel or drum C. The outsides of the barrels or drums are provided with teeth or cogs, which are for the purpose of communicating motion to the drive-chain F. The drive-chain F passes around the barrel or drum C, as shown in the drawings, and also passes around the idle-wheel F', as shown. The bars $c\ c$ are rigidly attached to the arms $b\ b$, and are for the purpose of holding in proper position or location the detents $d\ d$ and $d'\ d'$, as seen in Fig. 5, said detents being located and arranged substantially as shown in said Fig. 5. In case the detents are attached to the arms $b\ b$ the bars $c\ c$ may be omitted; but I prefer to attach said detents as shown.

It will be seen that by my peculiar arrangement of the detents $d\ d$ and $d'\ d'$ the drive-chain F will be permitted to run only in one direction, thus winding up the spring D by any up-and-down motion of the frame B resulting from the jar of the traveling wheel or wheels caused by an unevenness of the ground or track upon which the wheel or wheels travel. The spring D will also be wound up by the jolting motion of the operator, as hereinafter described.

It will be seen that by attaching the spring D to the axle A and to the periphery of the barrel or drum C the spring D will be wound sufficiently tight to communicate motion to the axle A by any up-and-down motion of the frame B as the wheel or wheels pass over any unevenness, or a jolting motion of the operator.

To the top or upper end of the frame B is attached the spiral spring G at its lower end, its upper end being attached to the yoke H, as seen in Figs. 3 and 5. It will be seen that by placing the spring G as shown it will provide a suitable spring-seat for the operator, and at the same time permit the arms *b b* to slide up and down through the frame B, thereby winding up the spring D by means of the drive-chain F and the detents *d d* and *d' d'*.

The operations of my invention are as follows: As the frame B is moved either up or down, as above described, it carries with it the drive-chains F and the idle-wheel F', and as the drive-chains can only pass the detents *d d* and *d' d'* in one direction upon each side, and the directions being opposite, causes the barrel or drum C to be turned faster than the axle A, and thereby winding up the spring D and causing said spring to spend its force in revolving the axle A.

The detents *d d* and *d' d'* may, if desired, be so constructed as to lock the drive-chain by friction; but I prefer using said detents as shown, and providing notches J either upon the edges or faces of the drive-chains, the detents being adjusted with reference to the location of said notches J. The frame B is securely held in proper position by means of the arms K, said arms being provided with apertures, through which the arms *b b* pass, as shown in the drawings. In case more force is required the drive-chain is placed on the small wheel of the barrel or drum and on the large idle-wheel.

Having now fully described my invention, what I claim as new, and desire to secure by Letters Patent, is—

1. In a device for utilizing the jar in wheeled vehicles, the combination, with a vertical movable frame carrying a barrel or drum and an idle-wheel located one above the other and connected together by a drive-chain, of an axle carrying a wheel passing through the barrel or drum and having its bearing in the movable frame and a coiled spring located in said drum having one end connected therewith and the other end connected with the axle, substantially as and for the purpose described.

2. The combination, with the yoke H, carrying the vertically-movable frame B, and the toothed drum or barrel C and toothed idle-wheel F', mounted at opposite ends of the movable frame and connected together by the drive-chain F, of the axle A, having its bearings in frame B, and coiled spring D, secured to said axle and to the drum through which it passes, substantially as and for the purpose described.

3. The combination, with the yoke H, movable frame B, carrying barrel or drum C and idle-wheel F' at opposite ends thereof, connected together by drive-chain F, the axle A, and coiled spring D, connected to the axle and to the drum C, of the detents *d d* and *d' d'*, secured to the bars *c c* of the arms *b b* and adapted to engage with the notches J J of the drive-chain F, substantially as and for the purpose described.

4. The combination, with yoke H and frame B, vertically movable therein, carrying drum C and wheel F', connected together by drive-chains F, the axle A, passing through frame B, and coiled spring D, connected to drum C and to axle A, of the spring G, connected with yoke H and frame B, substantially as and for the purpose described.

In testimony that I claim the above I have hereunto subscribed my name in the presence of two witnesses.

THEOPHILUS H. PAESSLER.

Witnesses:
L. C. WISE,
FRED. W. BOND.